United States Patent
Danz

(10) Patent No.: US 7,729,856 B2
(45) Date of Patent: Jun. 1, 2010

(54) METHOD AND DEVICE FOR DETECTING OBJECTS IN THE SURROUNDINGS OF A VEHICLE

(75) Inventor: Christian Danz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 10/557,213

(22) PCT Filed: Apr. 14, 2004

(86) PCT No.: PCT/EP2004/050514

§ 371 (c)(1),
(2), (4) Date: Feb. 21, 2007

(87) PCT Pub. No.: WO2004/104631

PCT Pub. Date: Dec. 2, 2004

(65) Prior Publication Data

US 2007/0182587 A1   Aug. 9, 2007

(30) Foreign Application Priority Data

May 22, 2003 (DE) ................................ 103 23 144

(51) Int. Cl.
*G08G 1/16* (2006.01)
*B60W 30/08* (2006.01)

(52) U.S. Cl. ........................ 701/301; 701/300; 340/901; 340/903; 340/904

(58) Field of Classification Search ................. 340/903, 340/435, 904, 932.2, 943.7, 901, 500; 701/117, 701/301, 300; 130/169; 342/73, 173–174, 342/29, 41, 45; 348/135, 138, 142
See application file for complete search history.

(56) References Cited

U.S. PATENT DOCUMENTS 4,083,052 A * 4/1978 Metcalf .................... 346/18

(Continued)

FOREIGN PATENT DOCUMENTS

CN   2139702   8/1993

(Continued)

OTHER PUBLICATIONS

Real-time optimized obstacle avoidance for robotic vehicles: Indoor experiments; Shunya Kobayashi; Kenichiro Nonaka; ICCAS-SICE, 2009; Aug. 18-21, 2009 pp. 3193-3198.*

(Continued)

*Primary Examiner*—Cuong H Nguyen
(74) *Attorney, Agent, or Firm*—Kenyon & Kenyon LLP

(57) ABSTRACT

A method and a device for detecting objects in the blind spot of a vehicle are provided, which make it possible, through an adaptively decreased measuring time, to achieve a shorter response time for alerting a driver in the event of an imminent collision with an object in the blind spot. Due to the fact that the frequency and/or the width of a measuring signal is/are set as a function of the previously determined distance between the vehicle and the object, it is possible to increase the sampling rate proportional to the decrease in the distance between the vehicle and the object. This makes it possible to detect the closest object more rapidly, i.e., for the most relevant object for a potential collision to be evaluated, thereby generating an adequately early collision alert. The frequency of a measuring signal is preferably set reciprocally proportional to the determined distance between the vehicle and the object.

9 Claims, 2 Drawing Sheets

U.S. PATENT DOCUMENTS

| | | | | |
|---|---|---|---|---|
| 4,209,843 | A | * | 6/1980 | Hyatt .................. 708/422 |
| 4,214,269 | A | * | 7/1980 | Parker et al. .......... 348/442 |
| 4,491,930 | A | * | 1/1985 | Hyatt .................. 708/3 |
| 4,788,441 | A | * | 11/1988 | Laskowski ............ 250/559.38 |
| 4,910,520 | A | * | 3/1990 | Rosen et al. .......... 342/25 A |
| 4,931,930 | A | * | 6/1990 | Shyu et al. ........... 701/36 |
| 5,208,586 | A | * | 5/1993 | Friberg et al. ......... 340/932.2 |
| 5,359,331 | A | | 10/1994 | Adler |
| 5,410,621 | A | * | 4/1995 | Hyatt .................. 382/260 |
| 5,583,495 | A | | 12/1996 | Lulu |
| 5,764,299 | A | * | 6/1998 | Jennes et al. .......... 348/500 |
| 5,771,077 | A | * | 6/1998 | Jennes et al. .......... 348/571 |
| 5,771,078 | A | * | 6/1998 | Jennes et al. .......... 348/678 |
| 5,905,457 | A | * | 5/1999 | Rashid ................ 342/70 |
| 6,002,639 | A | * | 12/1999 | Birchak et al. ........ 367/35 |
| 6,259,374 | B1 | * | 7/2001 | Kisner et al. ......... 340/905 |
| 6,345,228 | B1 | * | 2/2002 | Lees .................. 701/117 |
| 6,812,884 | B2 | * | 11/2004 | Richley et al. ........ 342/125 |
| 7,082,171 | B1 | * | 7/2006 | Johnson et al. ........ 375/316 |
| 7,164,117 | B2 | * | 1/2007 | Breed et al. .......... 250/221 |
| 7,379,515 | B2 | * | 5/2008 | Johnson et al. ........ 375/347 |
| 7,554,508 | B2 | * | 6/2009 | Johnson et al. ........ 343/893 |
| 2003/0001772 | A1 | * | 1/2003 | Woodington et al. ..... 342/70 |
| 2004/0178947 | A1 | * | 9/2004 | Richley et al. ........ 342/118 |
| 2005/0046584 | A1 | * | 3/2005 | Breed ................. 340/825.72 |
| 2006/0208169 | A1 | * | 9/2006 | Breed et al. .......... 250/221 |
| 2007/0182587 | A1 | * | 8/2007 | Danz .................. 340/903 |

FOREIGN PATENT DOCUMENTS

| | | | | |
|---|---|---|---|---|
| CN | 1791806 | A | * | 6/2006 |
| DE | 10323144.7 | | * | 5/2003 |
| EP | 0 726 473 | | | 8/1996 |
| EP | 1629302 | A1 | * | 3/2006 |
| GB | 2 315 628 | | | 2/1998 |
| JP | 54092101 | A | * | 7/1979 |
| JP | 05288765 | A | * | 11/1993 |
| JP | 05288767 | A | * | 11/1993 |
| JP | 06187035 | A | * | 7/1994 |
| JP | 06321099 | A | * | 11/1994 |
| JP | 06321109 | A | * | 11/1994 |
| JP | 09123868 | A | * | 5/1997 |
| WO | WO 95/23079 | | | 8/1995 |
| WO | WO 2004104631 | A1 | * | 12/2004 |
| WO | PCT/EP04/50514 | | * | 2/2007 |

OTHER PUBLICATIONS

Follow me! mobile team coordination in wireless sensor and actuator networks; Bosch, S.; Marin-Perianu, M.; Marin-Perianu, R.; Scholten, H.; Havinga, P.; Pervasive Computing and Communications, 2009. PerCom 2009. IEEE International Conference on Mar. 9-13, 2009 pp. 1-11; Digital Object Identifier 10.1109/PERCOM. 2009.4912763.*

A Dynamic Target Tracking of Car-Like Wheeled Robot in a Sensor-Network Environment via Fuzzy Decentralized Sliding-Mode Grey Prediction Control;Chih-Lyang Hwang; Tsai-Hsiang Wang; Ching-Chang Wong; Robotics and Automation, 2007 IEEE International Conference on; Apr. 10-14, 2007 pp. 3463-3469; Digital Object Identifier 10.1109/ROBOT.2007.3640.*

Trajectory duplication using relative position information for automated ground vehicle convoys; Travis, W.; Bevly, D.M.; Position, Location and Navigation Symposium, 2008 IEEE/ION; May 5-8, 2008 pp. 1022-1032; Digital Object Identifier 10.1109/PLANS. 2008.4570076.*

UTDrive: Driver Behavior and Speech Interactive Systems for In-Vehicle Environments; Angkititrakul, P.; Petracca, M.; Sathyanarayana, A.; Hansen, J.H.L.; Intelligent Vehicles Symposium, 2007 IEEE; Jun. 13-15, 2007 pp. 566-569 Digital Object Identifier 10.1109/IVS.2007.4290175.*

Quantitative characterization of the vehicle motion environment (VME); Ervin, R.D.; MacAdam, C.C.; Gilbert, K.; Tchoryk, P., Jr.; Vehicle Navigation and Information Systems Conference, 1991; vol. 2, Oct. 20-23, 1991 pp. 1011-1029.*

Design Of Ultrasonic Linear Array System For Multi-object Identification; Ming Yang; Hill, S.L.; Gray, J.O.; Intelligent Robots and Systems, 1992., Proceedings of the 1992 IEEE/RSJ International Conference on; vol. 3, Jul. 7-10, 1992 pp. 1625-1632.*

Optical phased array technology; McManamon, P.F.; Dorschner, T.A.; Corkum, D.L.; Friedman, L.J.; Hobbs, D.S.; Holz, M.; Liberman, S.; Nguyen, H.Q.; Resler, D.P.; Sharp, R.C.; Watson, E.A.; Proceedings of the IEEE, vol. 84, Issue 2, Feb. 1996 pp. 268-298; Digital Object Identifier 10.1109/5.482231.*

* cited by examiner

METHOD AND DEVICE FOR DETECTING OBJECTS IN THE SURROUNDINGS OF A VEHICLE

FIELD OF THE INVENTION

The present invention relates to a method and a device for detecting objects in the surroundings of a vehicle.

BACKGROUND INFORMATION

Devices for detecting objects in the surroundings of a vehicle include those device which monitor the blind spot of a vehicle, which are known as blind spot detection systems (BSD systems). These systems are generally used for electronically detecting objects in the surroundings of the vehicle which are difficult for the driver to observe without turning his/her head to the side. Such head turning (looking over the shoulder) is not possible in many cases because of the associated neglect of the traffic situation ahead. In particular on multi-lane roads, a BSD system signals to the driver of a vehicle when another vehicle (object) is passing at a lower differential velocity, thereby remaining in the blind spot to the right or left of the vehicle longer than only an instant. The danger of an accident because of overlooking other vehicles during a lane change may be reduced due to such information being available to the driver.

According to the known art, sensors for detecting external vehicles (objects) or for evaluating collision scenarios are used in vehicles. These sensors use ultrasonic, radar, or light waves to detect the existence of objects in a contactless manner and are also able to measure the vehicle's distance to the objects.

A device for detecting objects in the blind spot of a vehicle described in U.S. Pat. No. 5,583,495 includes individual ultrasonic waves which are generated at a predefined angle via a signal generator. The ultrasonic waves, subsequently reflected or scattered by a potential object, are received and amplified by an ultrasonic receiver. A point in time of a potential collision between the object and the host vehicle is calculated from this ultrasonic signal, the vehicle's velocity, and the vehicle's steering angle. Moreover, the device described in U.S. Pat. No. 5,583,495 has means for communicating with the driver which, in the event of a likely collision with an object situated in the blind spot, trigger an alert or inform the driver in another suitable way.

A disadvantage of the known ultrasound-based BSD systems is their particularly long response time. Due to the lower propagation rate of sound waves (compared to radar waves or light waves), the measuring time of ultrasound-based BSD systems is longer than the measuring time of comparable radar-based or light wave-based BSD systems. The response time of the system is longer due to the longer measuring time so that, in the event of a potential collision with an object in the blind spot, the appropriate warning to the driver is delayed. However, the use of faster radar sensors or light sensors entails a substantial cost disadvantage.

Therefore, it is an object of the present invention to provide a method and a device for detecting objects in the surroundings of a vehicle via which a shorter measuring time and consequently a shorter response time are facilitated for alerting the driver in the event of an imminent collision with an object in the vehicle's surroundings. This makes it possible in particular to use cost-effective ultrasonic sensors.

SUMMARY

In contrast to conventional BSD systems, the main advantage of the present invention is the rapid response time of a BSD system according to the present invention. Due to the fact that the frequency and/or the width of a measuring signal is/are set as a function of the predetermined distance between the vehicle and the object, it is possible according to the present invention to increase the sampling rate proportionately to the decrease in the distance between the vehicle and the object. This makes it possible to detect the closest object more rapidly, i.e., for the most relevant object for a potential collision to be detected, thereby generating an adequately early collision alert. The frequency of a measuring signal may be set reciprocally proportional to the determined distance between the vehicle and the object. This makes it possible in particular to implement an ultrasound-based BSD system which exhibits an adequately rapid response time. A substantial cost advantage may be achieved by using ultrasonic sensors.

By using the method according to the present invention, the surroundings of the vehicle are initially monitored using measuring technology within a relatively great distance (up to 3 m). If an object potentially eligible for a collision is detected within this distance, the frequency of the measuring signal and thus the sampling rate are increased, corresponding to the object's approach of the vehicle. Therefore, the method according to the present invention ensures that objects may be detected from an adequate distance (e.g., a range of 3 m), and it also ensures that the object behavior may be evaluated more accurately and more rapidly at a shorter distance (less than 3 m) since the object distance may be temporally better resolved due to the increased sampling rate (increased frequency of the measuring signal).

With the aid of this improved and more real-time knowledge of the object behavior relative to the vehicle's position, and with the aid of additional data, e.g., the vehicle velocity and the steering angle, and/or the yaw angle, a conclusion may be drawn about a possible collision time with adequate accuracy and adequate speed. An instantaneous collision alert may be output to the driver in particular given a change in the situation, e.g., a steering motion by the driver or a suddenly occurring fast approach of the object.

According to the present invention, the device for detecting an object in the surroundings of a vehicle includes:

- a means for transmitting measuring signals having a predefined frequency and width;
- a means for receiving the measuring signals, reflected and/or scattered by a measuring object, within a predefined time interval subsequent to the transmission of the measuring signals;
- a means for analyzing the received measuring signals; and
- a means for controlling the frequency and/or the width of the measuring signals which is connected to the means for analyzing the received measuring signals and to the means for transmitting the measuring signals.

DETAILED DESCRIPTION

While the method and device according to the present invention may be used for detecting objects in the entire surroundings of the vehicle, it is particularly advantageous to monitor the region of the surroundings which is not directly visible to the driver of the vehicle.

Regions, known as blind spots, which are not visible to the driver, even when using the vehicle mirrors, also appear in the vehicle's surroundings. Therefore, monitoring of this region around the vehicle is particularly desirable. The present invention is thus described below in the context of an example for monitoring the blind spot.

Figure 1:
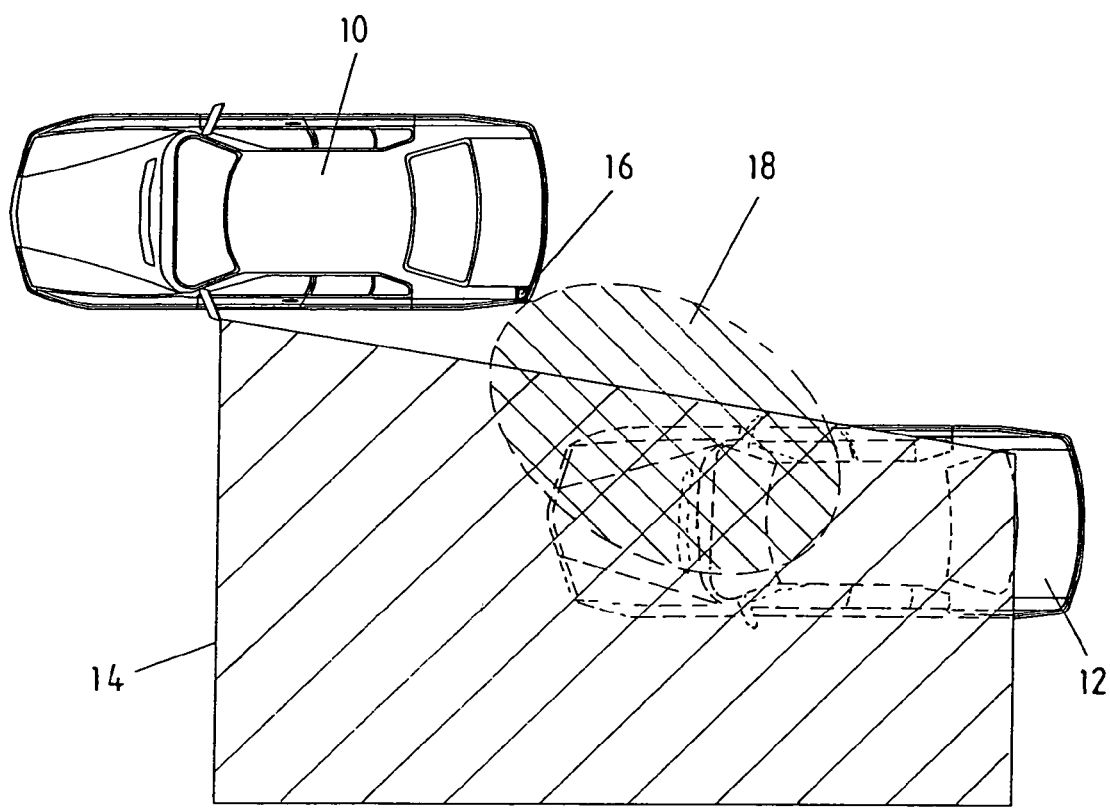
FIG. 1 shows a schematic representation of the detection region of an ultrasonic sensor with respect to the blind spot of a vehicle.

FIG. 1 shows a schematic representation of detection region 18 of ultrasonic sensor 16, as well as object 12 situated in blind spot 14 of vehicle 10. For the sake of clarity, FIG. 1 shows only blind spot 14 on the left side of vehicle 10. Ultrasonic sensor 16 is situated on the left rear end of vehicle 10. The present invention provides the utilization of the present ultrasonic sensors of an ultrasonic Park Pilot® system, which is already installed in some passenger cars, to achieve an additional cost advantage. The ultrasonic sensors of the Park Pilot® system become active at velocities less than 15 km/h to assist the driver in parking operations. However, these ultrasonic sensors may also be used in the velocity range greater than 15 km/h to detect close objects 12 which, at the moment of passing, are situated alongside vehicle 10, i.e., in blind spot 14. This saves the use of additional sensors. The range of the presently available ultrasonic sensors is approximately 2.5 m to 3 m. It may thus be ensured that objects moving along closely in the blind spot may be detected.

Figure 2:
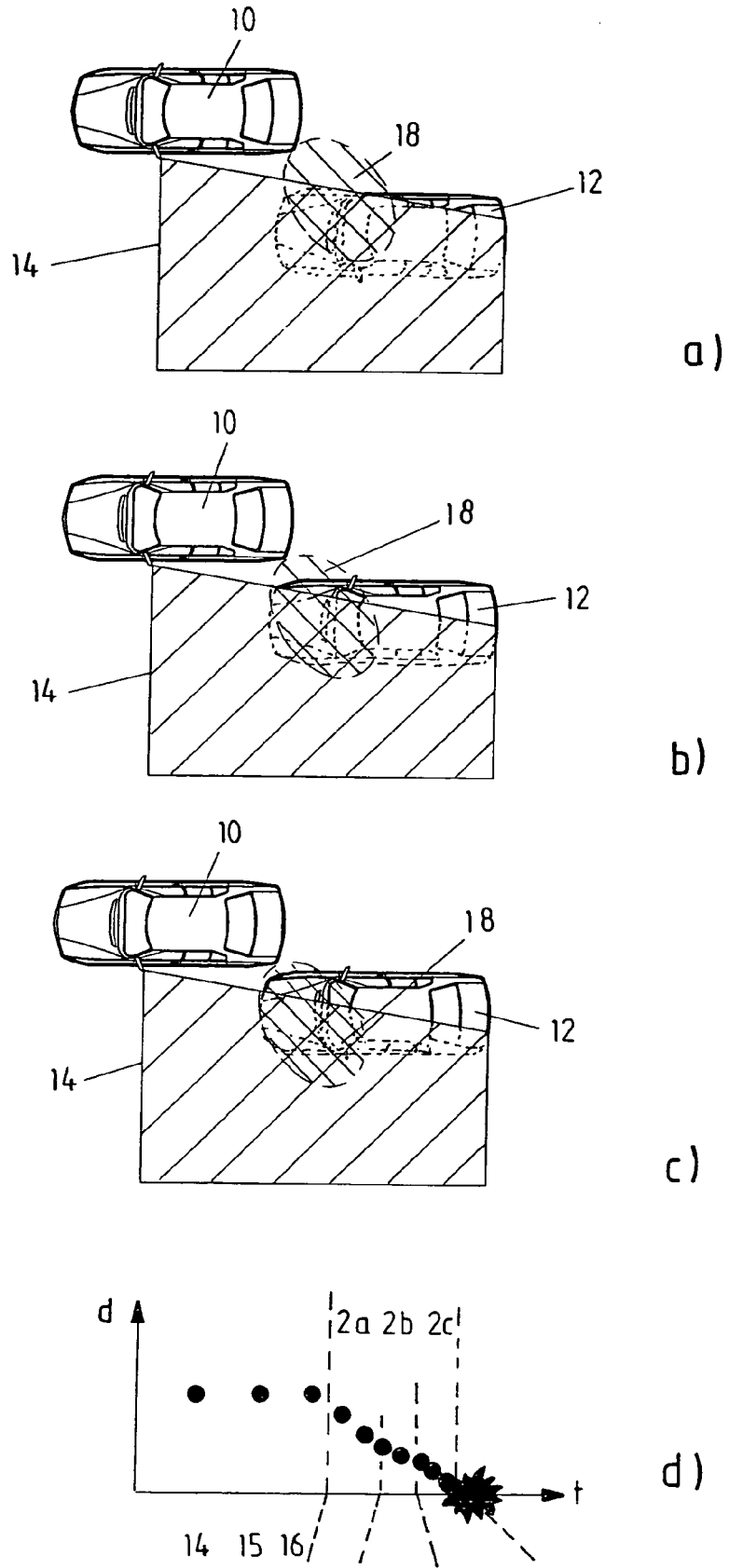
FIGS. 2a, 2b and 2c show a schematic representation of a sequence of the approach of an object situated in the blind spot of a vehicle.
FIG. 2d shows a graph illustrating the increase in the sampling rate as a function of the determined distance between the vehicle and the object.

FIGS. 2a, 2b, and 2c show an object 12, which is at least partially situated in blind spot 14, approaching a vehicle 10. In FIG. 2a, object 12 is already situated within detection region 18 of ultrasonic sensor 16. Reference numeral d (as shown in FIG. 2d) represents the distance between vehicle 10 and object 12. According to the present invention, the sampling rate, i.e., the frequency of the measuring signal, is increased in response to the decrease in distance d between vehicle 10 and object 12. FIG. 2d schematically shows the increase in the sampling rate as a function of the decrease of distance d. As shown in FIG. 2d, the frequency of the measuring signal, i.e., the sampling rate, is increased as a result of the decrease in the distance of object 12 relative to vehicle 10. Therefore, there are correspondingly more measured values in a certain time interval regarding distance d of object 12 from vehicle 10. For example, let us assume the measured values at points in time t7 and t8 represent the measurements for the relative distance corresponding to FIG. 2a. According to the present invention, the sampling rate is increased as a result of the decrease in distance d. This makes it possible in a certain time interval to determine more measured values regarding distance d of object 12 from vehicle 10. Due to decreased distance d, the echo time of the ultrasonic waves from ultrasonic sensor 16 to the object and back is shorter. Similarly, let us assume the measured values at points in time t9 and t10 represent the measurements for the relative distance corresponding to FIG. 2b. Time interval [t9, t10] is shorter than the previous time interval [t7, t8]. During a further approach corresponding to FIG. 2c, the sampling rate is further increased, i.e., the measured values at points in time t11 and t12 represent the measurements for the relative distance corresponding to FIG. 2c, and interval [t11, t12] is in turn shorter than time interval [t9, t10].

The driver is alerted when the determined data indicates an imminent collision.

The present invention is not restricted to the exemplary embodiments described here.

What is claimed is:

1. A method for detecting an object in the surrounding environment of a vehicle, comprising:
   transmitting a measuring signal having a predefined sampling rate;
   receiving, within a predefined time interval subsequent to the transmission of the measuring signal, the measuring signal that has been at least one of reflected and scattered by an object in the surrounding environment of the vehicle;
   determining a distance between the vehicle and the object based on the received measuring signal; and
   setting a sampling rate of the measuring signal as a function of the determined distance between the vehicle and the object;
   wherein the distance between the vehicle and the object is determined based on an actual received measuring signal which has the predefined sampling rate.

2. The method as recited in claim 1, wherein the sampling rate of the measuring signal is set inversely proportional to the determined distance between the vehicle and the object.

3. The method as recited in claim 2, wherein the object is at least partially positioned in a blind spot of the vehicle, wherein the blind spot includes immediate left and rear areas surrounding the driver side of the vehicle.

4. The method as recited in claim 3, further comprising:
   determining a time of a potential collision between the vehicle and the object, based on at least an output signal of at least one steering angle sensor of the vehicle.

5. The method as recited in claim 4, wherein at least one of the measuring signal, the output signal of the at least one steering angle sensor, and an output signal of at least one yaw angle sensor of the vehicle is analyzed by an on-board computer of the vehicle.

6. The method as recited in claim 4, wherein the measuring signal is one of an ultrasonic signal, a radar signal, and a light-wave signal.

7. The method as recited in claim 6, wherein the measuring signal is the ultrasonic signal and is transmitted and received by an ultrasonic sensor of a Park Pilot® system.

8. The method as recited in claim 1, further comprising:
   determining a time of a potential collision between the vehicle and the object, based on at least an output signal of at least one steering angle sensor of the vehicle;
   wherein the sampling rate of the measuring signal is set inversely proportional to the determined distance between the vehicle and the object, wherein the object is at least partially positioned in a blind spot of the vehicle, wherein the blind spot includes immediate left and rear areas surrounding the driver side of the vehicle,
   wherein at least one of the measuring signal, the output signal of the at least one steering angle sensor, and an output signal of at least one yaw angle sensor of the vehicle is analyzed by an on-board computer of the vehicle, and
   wherein the measuring signal is one of an ultrasonic signal, a radar signal, and a light-wave signal.

9. The method as recited in claim 8, wherein the measuring signal is the ultrasonic signal and is transmitted and received by an ultrasonic sensor of a parking system.

* * * * *